(12) United States Patent
Fujikawa et al.

(10) Patent No.: US 6,559,084 B1
(45) Date of Patent: *May 6, 2003

(54) DIELECTRIC CERAMIC COMPOSITION AND ELECTRONIC DEVICE

(75) Inventors: Yoshinori Fujikawa, Tokyo (JP); Yoshihiro Terada, Tokyo (JP); Shigeki Sato, Tokyo (JP)

(73) Assignee: TDK Corporation, Tokyo (JP)

( * ) Notice: Subject to any disclaimer, the term of this patent is extended or adjusted under 35 U.S.C. 154(b) by 109 days.

This patent is subject to a terminal disclaimer.

(21) Appl. No.: 09/618,219

(22) Filed: Jul. 18, 2000

(30) Foreign Application Priority Data

Jul. 21, 1999 (JP) ............................ 11-206292

(51) Int. Cl.$^7$ ................................. H01G 4/12
(52) U.S. Cl. ................ 501/139; 501/138; 361/311; 361/321.5
(58) Field of Search ................ 501/138, 139; 361/321.5, 311

(56) References Cited

U.S. PATENT DOCUMENTS 6,226,172 B1 * 5/2001 Sato et al. ................ 361/311

FOREIGN PATENT DOCUMENTS

| JP | 56-078423 | 6/1981 |
|---|---|---|
| JP | 56-149709 | 11/1981 |
| JP | 01-175715 | 7/1989 |
| JP | 04-292458 | 10/1992 |
| JP | 04-292459 | 10/1992 |
| JP | 04-295048 | 10/1992 |
| JP | 05-109319 | 4/1993 |
| JP | 06-206766 | 7/1994 |
| JP | 06-243721 | 9/1994 |
| JP | A-8-31232 | 2/1996 |
| JP | 09-040465 | 2/1997 |
| JP | A-9-312234 | 12/1997 |
| JP | 10-025157 | 1/1998 |
| JP | 10-029862 | 2/1998 |

* cited by examiner

*Primary Examiner*—C. Melissa Koslow
(74) *Attorney, Agent, or Firm*—Oliff & Berridge, PLC

(57) ABSTRACT

A dielectric ceramic composition comprising a main component of $BaTiO_3$, a first subcomponent including at least one compound selected from MgO, CaO, BaO, SrO and $Cr_2O_3$, a second subcomponent of $(Ba, Ca)_x SiO_{2+x}$ (where, x=0.8 to 1.2), a third subcomponent including at least one compound selected from $V_2O_5$, $MoO_3$, and $WO_3$, and a fourth subcomponent including an oxide of R1 (where R1 is at least one element selected from Sc, Er, Tm, Yb, and Lu), a fifth subcomponent including an oxide of R2 (where R2 is at least one element selected from Y, Dy, Ho, Tb, Gb and Eu), wherein the ratios of the subcomponents to 100 moles of the main component of $BaTiO_3$ are first subcomponent of 0.1 to 3 moles, second subcomponent of 2 to 10 moles, third subcomponent of 0.01 to 0.5 mole, fourth subcomponent of 0.5 to 7 moles, and fifth subcomponent of 2 to 9 moles (where the number of moles of the fourth and fifth subcomponents are respectively the ratio of R1 and R2 alone).

16 Claims, 4 Drawing Sheets

Y4.00 Yb6.00 (1325°C)

Y4.00 Yb0.00 (1325°C)

Y8.00 Yb4.26 (1325°C)

Y0.00 Yb4.26 (1280°C)

DIELECTRIC CERAMIC COMPOSITION AND ELECTRONIC DEVICE

BACKGROUND OF THE INVENTION

1. Field of the Invention

The present invention relates to a dielectric ceramic composition having a resistance to reduction and to a multi-layer ceramic capacitor or other electronic device using the same, more particularly relates to a dielectric ceramic composition having a capacity-temperature characteristic satisfying the X8R characteristic of the Electronic Industries Association (EIA) standard (−55 to 150° C., ΔC=±15% or less) and capable of improving mechanical strength of an electronic device.

2. Description of the Related Art

A multi-layer ceramic capacitor, one type of electronic device, is being broadly used as a compact, large capacity, high reliability electronic device. The number used in each piece of electronic equipment has also become larger. In recent years, along with the increasing miniaturization and improved performance of equipment, there have been increasingly stronger demands for further reductions in size, increases in capacity, reductions in price, and improvements in reliability in multi-layer ceramic capacitors.

Multi-layer ceramic capacitors are normally produced by stacking a paste for forming the internal electrode layers and a paste for forming the dielectric layers using the sheet method or printing method etc. and then cofiring the internal electrode layers and dielectric layers in the stack together.

As the electroconductive material for the internal electrode layers, generally Pd or a Pd alloy is used, but since Pd is high in price, relatively inexpensive Ni, Ni alloys, and other base metals have come into use. When using a base metal as the electroconductive material of the internal electrode layers, firing in the atmosphere ends up oxidizing the internal electrode layers and therefore the cofiring of the dielectric layers and internal electrode layers has to be done in a reducing atmosphere. When being fired in a reducing atmosphere, however, the dielectric layers end up being reduced and becoming lower in specific resistance. Therefore, nonreducing type dielectric materials are being developed.

Further, a capacitor is also required to be excellent in temperature characteristics. In particular, in some applications, it is desired that the temperature characteristics be smooth under harsh conditions. In recent years, multi-layer ceramic capacitors have come into use for various types of electronic equipments such as the engine electronic control units (ECU) mounted in engine compartments of automobiles, crank angle sensors, antilock brake system (ABS) modules, etc. These electronic equipments are used for stabilizing engine control, drive control, and brake control, and therefore are required to have excellent circuit temperature stability.

The environment in which these electronic equipments are used is envisioned to be one in which the temperature falls to as low as −20° C. or so in the winter in cold areas or the temperature rises to as high as +130° C. or so in the summer right after engine startup. Recently, there has been a trend toward reduction of the number of wire harnesses used for connecting electronic apparatuses and the equipment they control. Electronic apparatuses are also being mounted outside of the vehicles in some cases. Therefore, the environment is becoming increasingly severe for electronic apparatuses. Accordingly, capacitors used for these electronic apparatuses have to have smooth temperature characteristics in a broad temperature range.

As temperature-compensating capacitor materials superior in temperature characteristics, (Sr, Ca)(Ti, Zr)$O_3$ based, Ca(Ti, Zr)$O_3$ based, $Nd_2O_3$-$2TiO_2$ based, $La_2O_3$-$2TiO_2$ based, and other materials are generally known, but these compositions have extremely low specific dielectric constants (generally less than 100), so it is substantially impossible to produce a capacitor having a large capacity.

As a dielectric ceramic composition having a high dielectric constant and a smooth capacity-temperature characteristic, a composition comprised of $BaTiO_3$ as a main component plus $Nb_2O_5$—$Co_3O_4$, MgO—Y, rare earth elements (Dy, Ho, etc.), $Bi_2O_3$—$TiO_2$, etc. is known. Looking at the temperature characteristic of a dielectric ceramic composition comprising $BaTiO_3$ as a main component, since the Curie temperature of pure $BaTiO_3$ is close to about 130° C., it is extremely difficult to satisfy the R characteristic of the capacity-temperature characteristic (ΔC=±15% or less) in the region higher in temperature than that. Therefore, a $BaTiO_3$ based high dielectric constant material can only satisfy the X7R characteristic of the EIA standard (−55 to 125° C., ΔC=±15% or less). If only satisfying the X7R characteristic, the material is not good enough for an electronic apparatus of an automobile which is used in the above-mentioned harsh environments. The above electronic apparatus requires a dielectric ceramic composition satisfying the X8R characteristic of the EIA standard (−55 to 150° C., ΔC=±15% or less).

To satisfy the X8R characteristic in a dielectric ceramic composition comprised of $BaTiO_3$ as a main component, it has been proposed to shift the Curie temperature to the high temperature side by replacing the Ba in the $BaTiO_3$ with Bi, Pb, etc. (Japanese Unexamined Patent Publication (Kokai) No. 10-25157 and No. 9-40465). Further, it has also been proposed to satisfy the X8R characteristic by selecting a $BaTiO_3$+$CaZrO_3$+ZnO+$Nb_2O_5$ based composition (Japanese Unexamined Patent Publication (Kokai) No. 4-295048, No. 4-292458, No. 4-292459, No. 5-109319, and No. 6-243721). In each of these compositions as well, however, since Pb, Bi, and Zn which are easily vaporised and scattered are used, firing in air or another oxidizing atmosphere becomes a prerequisite. Therefore, there are the problems that it is not possible to use an inexpensive base metal such as Ni for the internal electrodes of the capacitor and it is necessary to use Pd, Au, Ag, or another high priced precious metal.

Furthermore, in a dielectric ceramic composition of the related art, there are problems of not having resistance to repeated heat impulses from a low temperature to a high temperature, etc. so improvement in mechanical strength is required.

On the other hand, a method of improving the strength by forming acicula crystalline on outer surface regions of the both ends in the stack direction of a ceramic layered body has been proposed (Japanese Unexamined Patent Publication (kokai) No. 9-312234). In the method described in the publication, an oxide paste composed of $TiO_2$ as a main component is applied on the surface of the ceramic layered body, which is dried and then subjected to heat processing, consequently, the acicula crystalline is formed on the outer surface region of the ceramic. It is considered that the acicula crystalline is deposited substance of $Ba_4Ti_{13}O_{30}$, $Ba_6Ti_{17}O_{40}$, etc.

In the method described in the above publication, however, since the ceramic base is reduced when firing the ceramic layered body in the reducing atmosphere, acicula crystalline cannot be formed inside or close to the center of the ceramic layered body. Accordingly, forming of the acicula crystalline is limited only near the outer surface of the ceramic layered body and the mechanical strength is not sufficiently improved. Thus, when a thickness of a capacitor cover for protecting the ceramic layered body cannot be sufficiently secured, an electronic device having sufficient strength able to be used in practice cannot be obtained.

SUMMARY OF THE INVENTION

An object of the present invention is to provide a dielectric ceramic composition having a high specific dielectric constant and a capacity-temperature characteristic satisfying the X8R characteristic of the EIA standard (−55 to 150° C., ΔC=±15% or less), and able to be fired in a reducing atmosphere, and further, to provide a multi-layer ceramic capacitor or other electronic device using this dielectric ceramic composition.

To attain the above object, a dielectric ceramic composition according to a first aspect of the present invention comprises:

a main component of $BaTiO_3$, a first subcomponent including at least one compound selected from MgO, CaO, BaO, SrO and $Cr_2O_3$, a second subcomponent of $(Ba, Ca)_x SiO_{2+x}$ (where, x=0.8 to 1.2), a third subcomponent including at least one compound selected from $V_2O_5$, $MoO_3$, and $WO_3$, a fourth subcomponent including an oxide of R1 (where R1 is at least one element selected from Sc, Er, Tm, Yb, and Lu), and a fifth subcomponent including an oxide of R2 (where R2 is at least one element selected from Y, Dy, Ho, Tb, Gb and Eu), wherein the ratios of the subcomponents to 100 moles of the main component of $BaTiO_3$ are:

first subcomponent: 0.1 to 3 moles,
second subcomponent: 2 to 10 moles,
third subcomponent: 0.01 to 0.5 mole,
fourth subcomponent: 0.5 to 7 moles (where the number of moles of the fourth subcomponent is the ratio of R1 alone), and
fifth subcomponent: 2 to 9 moles (where the number of moles of the fifth subcomponent is the ratio of R2 alone).

Note that the ratio of Ba and Ca in the second subcomponent may be any, and only one of the two may be contained, as well.

Preferably, the dielectric ceramic composition according to the present invention further comprises as a sixth subcomponent MnO, the content of the sixth subcomponent being not more than 0.5 mole with respect to 100 moles of the main component of $BaTiO_3$.

Preferably, the total content of the fourth subcomponent and the fifth subcomponent are not more than 13 moles with respect to 100 moles of the main component of $BaTiO_3$ (where the numbers of moles of the fourth subcomponent and fifth subcomponent are the ratios of R1 and R2 alone).

A dielectric ceramic composition according to a second aspect of the present invention is comprised of a dielectric base phase containing $BaTiO_3$ as a main component, and plate-shaped or acicula deposition phase existing in the dielectric base phase. In the dielectric ceramic composition according to the second aspect of the present invention, materials of the deposition phase is not specifically limited, but composed of for example a composite oxide of Y, Yb and Ti, etc.

An electronic device according to the present invention is not specifically limited as far as it is an electronic device having a dielectric layer, which is for example a multi-layer ceramic capacitor device having a capacitor device body comprised of dielectric layers and internal electrode layers alternately stacked. In the present invention, the dielectric layer is comprised of any one of the above dielectric compositions. As the electroconductive material included in the internal electrode layers is not specifically limited, but for example Ni or an Ni alloy.

According to the present invention, a dielectric ceramic composition satisfying a X8R temperature characteristic (−55 to 150° C., ΔC=±15% or less), superior in a resistance to reduction and mechanical strength can be obtained.

In the present invention, the mechanical strength is improved by the ratio of R2 being 2 moles or more with respect to 100 moles of $BaTiO_3$ and by adding the same together with R1. Such a new knowledge was found for the first time by the present inventors.

Note that when the ratio of R1 is less than 0.5 moles, it tends to become difficult to obtain the X8R characteristic, while when R2 exceeding 9 moles or R1 exceeding 7 moles is added to the composition, there is a tendency that sinterability is deteriorated and preferable electric characteristics cannot be obtained, and also, sufficient mechanical strength cannot be obtained.

Also, it is observed in the present invention that mechanical strength is improved in the dielectric ceramic composition wherein plate-shaped or acicula deposition phase is detected inside the dielectric base phase comparing with the one wherein the deposition phase is not detected.

Also, the dielectric ceramic composition according to the present invention is capable of being fired in a reducing atmosphere, and can be used for multi-layer chip capacitor materials having internal electrodes composed of base metals such as Ni and Ni alloy, etc.

BRIEF DESCRIPTION OF THE DRAWINGS

These and other objects and features of the present invention will become clearer from the following description of the preferred embodiments given with reference to the attached drawings, in which.

DESCRIPTION OF THE PREFERRED EMBODIMENTS

Multi-layer Ceramic Capacitor

Figure 1:
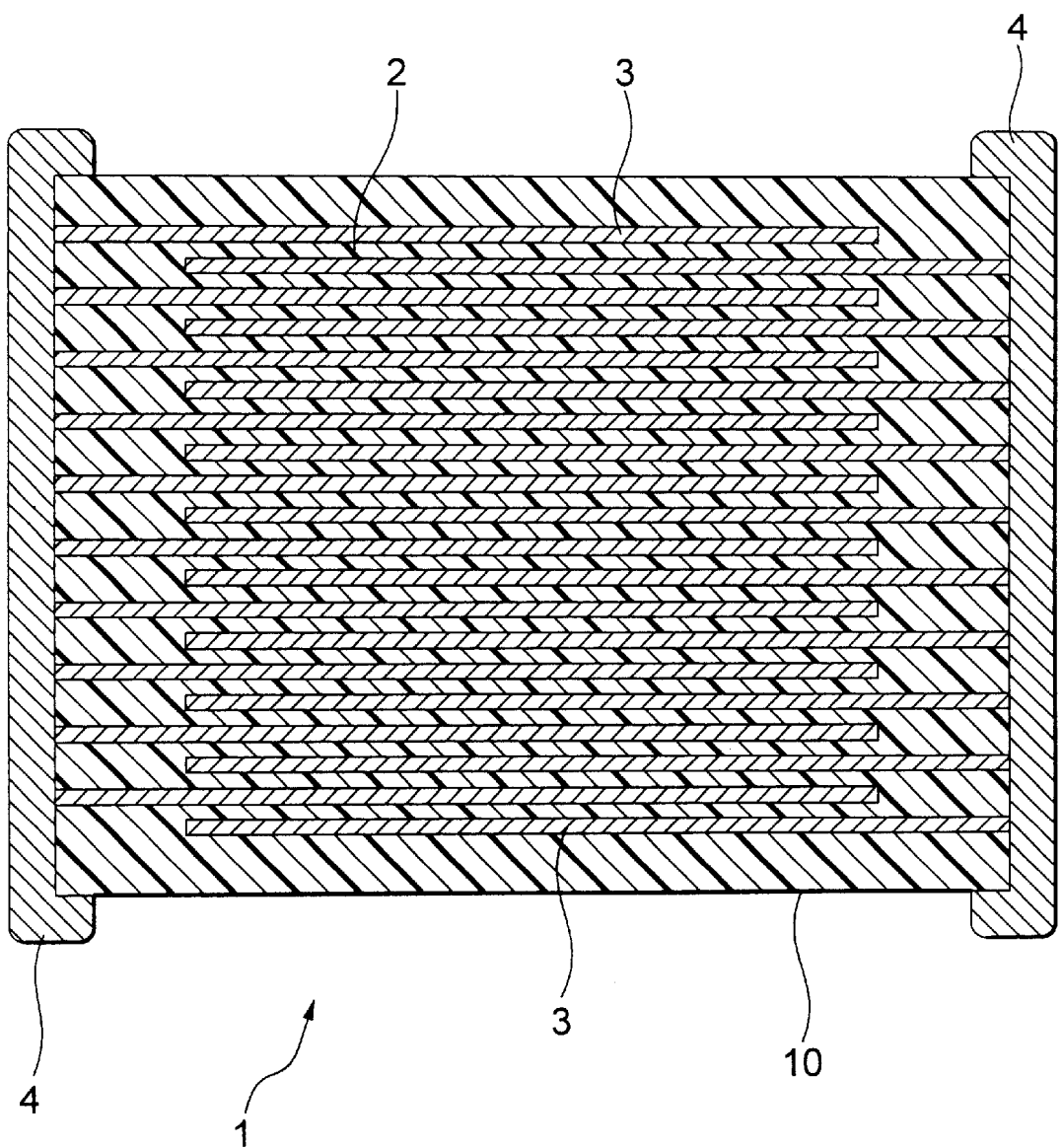
FIG. 1 is a sectional view of a multi-layer ceramic capacitor according to an embodiment of the present invention.

As shown in FIG. 1, the multi-layer ceramic capacitor 1 according to one embodiment of the present invention has a capacitor device body 10 of a configuration of dielectric layers 2 and internal electrode layers 3 layered alternately. At the two ends of the capacitor device body 10 are formed a pair of external electrodes 4 conductive with the internal electrode layers 3 alternately arranged inside the device body 10. The shape of the capacitor device body 10 is not particularly limited, but normally is made a parallelepiped. Further, the dimensions are not particularly limited and may be made suitable dimensions in accordance with the application. Usually, however, they are (0.6 to 5.6 mm)×(0.3 to 5.0 mm)×(0.3 to 1.9 mm).

The internal electrode layers 3 are layered so that end faces thereof alternately protrude out to the surfaces of the two opposing ends of the capacitor device body 10. The pair of external electrodes 4 are formed at the two ends of the capacitor device body 10 and are connected to the exposed end faces of the alternately arranged internal electrode layers 3 so as to compose the capacitor circuit.

Dielectric Layer 2

The dielectric layer 2 contain a dielectric ceramic composition of the present invention.

The dielectric ceramic composition of the present invention comprises:

a main component of $BaTiO_3$, a first subcomponent including at least one compound selected from MgO, CaO, BaO, SrO and $Cr_2O_3$, a second subcomponent of $(Ba, Ca)_xSiO_{2+x}$ (where, x=0.8 to 1.2), a third subcomponent including at least one compound selected from $V_2O_5$, $MoO_3$, and $WO_3$, a fourth subcomponent including an oxide of R1 (where R1 is at least one element selected from Sc, Er, Tm, Yb, and Lu), and a fifth subcomponent including an oxide of R2 (where R2 is at least one element selected from Y, Dy, Ho, Tb, Gd and Eu).

The ratios of the above subcomponents to 100 moles of the main component of $BaTiO_3$ are:

first subcomponent: 0.1 to 3 moles,
second subcomponent: 2 to 10 moles,
third subcomponent: 0.01 to 0.5 mole,
fourth subcomponent: 0.5 to 7 moles, and
fifth subcomponent: 2 to 9 moles,
and preferably,
first subcomponent: 0.5 to 2.5 moles,
second subcomponent: 2.0 to 5.0 moles,
third subcomponent: 0.1 to 0.4 mole,
fourth subcomponent: 0.5 to 5.0 moles, and
fifth subcomponent: 2 to 8 moles.

Note that the ratio of the fourth subcomponent and the fifth subcomponent is not the molar ratio of the R1 oxide and the R2 oxide, but the molar ratio of R1 and R2 alone. That is, when for example using an oxide of Yb as the fourth subcomponent, a ratio of the fourth subcomponent of 1 mole does not mean the ratio of the $Yb_2O_3$ is 1 mole, but the ratio of Yb is 1 mole.

In this specification, the oxides constituting the main component and the subcomponents are expressed by stoichiochemical compositions, but the oxidized state of the oxides may also deviate from the stoichiochemical compositions. The ratios of the subcomponents, however, are obtained by converting from the amounts of the metals contained in the oxides constituting the subcomponents to the oxides of the above stoichiochemical compositions.

The reasons for limiting the contents of the above subcomponents are as follows.

If the content of the first subcomponent (MgO, CaO, BaO, SrO, and $Cr_2O_3$) is too small, the rate of change of the capacity-temperature characteristic ends up becoming large. on the other hand, if the content is too large, the sinterability deteriorates. Note that the ratios of the oxides in the first subcomponent may be any ratios.

The BaO and the CaO in the second subcomponent [(Ba, Ca)$_x$SiO$_{2+x}$] are also contained in the first subcomponent, but the composite oxide $(Ba, Ca)_xSiO_{2+x}$ has a low melting point, so it has good reactivity with the main component. Therefore, in the present invention, the BaO and/or CaO are also added as the above composite oxide. If the content of the second subcomponent is too small, the capacity-temperature characteristic becomes poor and the IR (insulation resistance) falls. On the other hand, if the content is too great, the dielectric constant ends up falling rapidly. The x in the $(Ba, Ca)_xSiO_{2+x}$ is preferably 0.8 to 1.2, more preferably 0.9 to 1.1. If x is too small, that is, if the $SiO_2$ is too great, the main component of $BaTiO_3$ will be reacted with and the dielectric property will end up deteriorating. On the other hand, if x is too large, the melting point will become high and the sinterability will be deteriorated, so this is not preferable. Note that the ratios of Ba and Ca in the second subcomponent are any ratios. A subcomponent containing just one (Ba or Ca) is also possible.

The third subcomponent ($V_2O_5$, $MoO_3$, and $WO_3$) exhibits the effect of smoothing the capacity-temperature characteristic above the Curie temperature. If the content of the third subcomponent is too small, the effect become insufficient. On the other hand, if the content is too great, the IR remarkably falls. Note that the ratios of the oxides in the third subcomponent may be any ratios.

The fourth subcomponent (R1 oxide) exhibits the effect of shifting the Curie temperature to the high temperature side and the effect of smoothing the capacity-temperature characteristic. If the content of the fourth subcomponent is too small, these effects become insufficient and the capacity-temperature characteristic ends up deteriorating. On the other hand, if the content is too large, the sinterability tends to deteriorate. Among the fourth subcomponents, Yb oxide is preferred since it has a high effect on improvement of the characteristic and further is inexpensive in cost.

Where the fifth subcomponent (an oxide of R2) is added together with the fourth subcomponent (an oxide of R1), mechanical strength of a dielectric ceramic composition to be obtained sufficiently improves. Also the fifth subcomponent exhibits an effect of improvement of the IR and has little adverse effect on the capacity-temperature characteristic. If the content of the R2 oxide is too large, however, the sinterability tends to deteriorate. Among the fifth subcomponents, Y oxide is preferred since it has a high effect on improvement of the characteristic and further is inexpensive in cost.

The total content of the fourth subcomponent and the fifth subcomponent is preferably not more than 13 moles, with respect to 100 moles of the main component of $BaTiO_3$ (where the numbers of moles of the fourth subcomponent and the fifth subcomponent are ratios of R1 and R2 alone). This is to keep the sinterability good.

Further, the dielectric ceramic composition of the present invention may contain as a sixth subcomponent MnO. This sixth subcomponent exhibits the effect of promotion of sintering, the effect of an increase of the IR. To sufficiently obtain these effects, the ratio of the sixth subcomponent with respect to 100 moles of the $BaTiO_3$ is preferably at least 0.01 mole. If the content of the sixth subcomponent is too large, there is an adverse effect on the capacity-temperature characteristic, so the content is preferably made not more than 0.5 mole.

Further, the dielectric ceramic composition of the present invention may also contain $Al_2O_3$ in addition to the above oxides. $Al_2O_3$ does not have much of an effect on the capacity-temperature characteristic and exhibits the effect of improvement of the sinterability and the IR. If the content of the $Al_2O_3$ is too large, however, the sinterability deteriorates and the IR falls, so the $Al_2O_3$ is preferably included in an amount of not more than 1 mole with respect to 100 moles of the $BaTiO_3$, more preferably not more than 1 mole of the dielectric ceramic composition as a whole.

Note that when at least one element of Sr, Zr, and Sn replaces the Ba or Ti in the main component constituting the perovskite structure, the Curie temperature shifts to the low temperature side, so the capacity-temperature characteristic above 125° C. deteriorates. Therefore, it is preferable not to use a $BaTiO_3$ containing these elements [for example, (Ba, Sr)$TiO_3$] as a main component. There is however no particular problem with a level contained as an impurity (less than 0.1 mol % of the dielectric ceramic composition as a whole).

The average grain size of the dielectric ceramic composition of the present invention is not particularly limited and may be suitably determined in accordance with the thickness of the dielectric layers etc. from the range of for example 0.1 to 3.0 μm. The capacity-temperature characteristic deteriorates the thinner the dielectric layers are and tends to deteriorate the smaller the average grain is in size. Therefore, the dielectric ceramic composition of the present invention is particular effective when having to make the average grain size small, specifically, when the average grain size is 0.1 to 0.5 μm. Further, if the average grain size is made small, the IR lifetime becomes longer and further the change in the capacity under a direct current electric field over time becomes smaller, so it is preferable that the average grain size be small as explained above from this viewpoint as well.

The Curie temperature of the dielectric ceramic composition of the present invention (phase transition temperature from strong dielectric to ordinary dielectric) may be changed by selecting the composition, but to satisfy the X8R characteristic, it is preferably made at least 120° C., more preferably at least 123° C. Note that the Curie temperature may be measured using DSC (differential scan calorimetry) etc.

The thickness of the dielectric layers comprised of the dielectric ceramic composition of the present invention is normally not more than 40 μm, particularly not more than 30 μm, per layer. The lower limit of the thickness is normally about 2 μm. The dielectric ceramic composition of the present invention is effective for the improvement of the capacity-temperature characteristic of a multi-layer ceramic capacitor having such thinned dielectric layers. Note that the number of the dielectric layers stacked is normally 2 to 300 or so.

Note that the composition of the present invention has an effect of improvement of strength characteristics regardless of designs of a multi-layer chip capacitor.

The multi-layer ceramic capacitor using the dielectric ceramic composition of the present invention is suitable for use as an electronic device for equipment used at over 80° C., in particular in an environment of 125 to 150° C. Further, in this temperature range, the temperature characteristic of the capacity satisfies the R characteristic of the EIA standard and also satisfies the X8R characteristic. It is also possible to simultaneously satisfy the B characteristic of the Electronic Industries Association of Japan (EIAJ) standard [rate of change of capacity of within ±10% at −25 to 85° C. (reference temperature 20° C.)] and the X7R characteristic of the EIA standard (−55 to 125° C., ΔC=±15% or less).

In a multi-layer ceramic capacitor, the dielectric layers are normally subjected to an alternating current electric field of from 0.02V/μm, in particular from 0.2V/μm, further from 0.5V/μm, to generally not more than 5V/μm and a direct current electric field of not more than 5V/μm superposed over this, but the temperature characteristic of the capacity is extremely stable even when such electric fields are applied.

The dielectric ceramic composition of the present invention has a composition range as above and the device body after sintering comprises dielectric base phase of $BaTiO_3$ as the main composition and a plate or acicula deposition phase existing inside the dielectric base phase.

As explained above, the dielectric ceramic composition wherein the plate shaped or acicula deposition phase is detected inside the dielectric base phase satisfies the X8R characteristic and particularly exhibits the improvement in mechanical strength compared with dielectric ceramic compositions wherein the deposition phase is not detected.

Note that dielectric ceramic compositions wherein the plate-shaped or acicula deposition phase is detected inside the dielectric base phase other than the above composition range are included within the range of the present invention.

Internal Electrode Layers 3

The electroconductive material contained in the internal electrode layers 3 is not particularly limited, but a base metal may be used since the material constituting the dielectric layers 2 has a resistance to reduction. As the base metal used as the electroconductive material, Ni or an Ni alloy is preferable. As the Ni alloy, an alloy of at least one type of element selected from Mn, Cr, Co, and Al with Ni is preferable. The content of the Ni in the alloy is preferably not less than 95 wt %.

Note that the Ni or Ni alloy may contain P and other various types of trace components in amounts of not more than 0.1 wt % or so.

The thickness of the internal electrode layer may be suitably determined in accordance with the application etc., but is usually 0.5 to 5 μm, in particular 0.5 to 2.5 μm or so is preferable.

External Electrodes 4

The electroconductive material contained in the external electrodes 4 is not particularly limited, but in the present invention an inexpensive Ni, Cu, or alloys of the same may be used.

The thickness of the external electrodes may be suitably determined in accordance with the application etc., but is usually 10 to 50 μm or so.

Method of Manufacturing Multi-Layer Ceramic Capacitor

The multi-layer ceramic capacitor using the dielectric ceramic composition of the present invention, like the conventional multi-layer ceramic capacitor, is produced by preparing a green chip using the usual printing method or sheet method which uses pastes, firing the green chip, then printing or transferring and firing the external electrodes. The method of manufacture will be explained in detail below.

The dielectric layer paste may be an organic-based paint comprised of a mixture of a dielectric ingredient and an organic vehicle and may also be a water-based paint.

For the dielectric ingredient, use may be made of the above-mentioned oxides or mixtures thereof or composite oxides, but it is also possible to use one selected from various compounds or mixtures becoming the above oxides or composite oxides after firing, for example, carbonates, oxalates, nitrates, hydroxides, and organic metal compounds. The content quantity of the compounds in the dielectric ingredient may be suitably determined so as to give the above-mentioned composition of the dielectric ceramic composition after firing.

The dielectric ingredient is normally used as a powder of an average particle size of 0.1 to 3 $\mu$m.

The organic vehicle is comprised of a binder dissolved in an organic solvent. The binder used for the organic vehicle is not particularly limited, but may be suitably selected from ethyl cellulose, polyvinyl butyral, and other ordinary types of binders. Further, the organic solvent used is also not particularly limited and may be suitably selected from terpineol, butyl carbitol, acetone, toluene, and other organic solvents in accordance with the printing method, sheet method, or other method of use.

Further, when using a water-based paint as the dielectric layer paste, it is sufficient to knead a water-based vehicle comprised of a water-based binder or dispersant etc. dissolved in water together with the dielectric layer ingredient. The water-based binder used for the water-based vehicle is not particularly limited. For example, a polyvinyl alcohol, cellulose, water-based acrylic resin, etc. may be used.

The internal electrode layer paste is prepared by kneading the electroconductive material comprised of the above various types of electroconductive metals and alloys or various types of oxides becoming the above electroconductive materials after sintering, an organic metal compound, resinate, etc. together with the above organic vehicle.

The external electrode paste may be prepared in the same way as the above internal electrode layer paste.

The content of the organic vehicle in the above pastes is not particularly limited and may fall within the usual content, for example, the binder may be contained in an amount of 1 to 5 wt % or so and the solvent 10 to 50 wt % or so. Further, the pastes may include, in accordance with need, various types of additives selected from dispersants, plasticizers, dielectrics, insulators, etc. The total content of these is preferably not more than 10 wt %.

When using a printing method, the dielectric layer paste and the internal electrode layer paste are successively printed on the PET or other substrate. The result is then cut into a predetermined shape, then the pastes are peeled off from the substrate to form a green chip.

Further, when using a sheet method, a dielectric layer paste is used to form a green sheet, the internal electrode layer paste is printed on upper surface of this, then these are stacked to form a green chip.

Before firing, the green chip is processed to remove the binder. This processing for removing the binder may be performed under ordinary conditions, but when using Ni or an Ni alloy or other base metal for the electroconductive material of the internal electrode layer, this is preferably performed under the following conditions:

Rate of temperature rise: 5 to 300° C./hour, in particular 10 to 100° C./hour

Holding temperature: 180 to 400° C., in particular 200 to 300° C.

Temperature holding time: 0.5 to 24 hours, in particular 5 to 20 hours

Atmosphere: in the air

The atmosphere when firing the green chip may be suitably determined in accordance with the type of the electroconductive material in the internal electrode layer paste, but when using Ni or an Ni alloy or other base metal as the electroconductive material, the oxygen partial pressure in the firing atmosphere is preferably made $10^{-8}$ to $10^{-15}$ atms. If the oxygen partial pressure is less than this range, the electroconductive material of the internal electrode layers becomes abnormally sintered and ends up breaking in the middle in some cases. Further, if the oxygen partial pressure is more than the above range, the internal electrode layers tend to oxidize.

Further, the holding temperature at the time of firing is preferably 1100 to 1400° C., more preferably 1200 to 1360° C., still more preferably 1200 to 1320° C. If the holding temperature is less than the above range, the densification becomes insufficient, while if over that range, there is a tendency toward breaking of the electrodes due to abnormal sintering of the internal electrode layers, deterioration of the capacity-temperature characteristic due to dispersion of the material comprising the internal electrode layers, and reduction of the dielectric ceramic composition.

The various conditions other than the above conditions are preferably selected from the following ranges:

Rate of temperature rise: 50 to 500° C./hour, in particular 200 to 300° C./hour

Temperature holding time: 0.5 to 8 hours, in particular 1 to 3 hours

Cooling rate: 50 to 500° C./hour, in particular 200 to 300° C./hour

Note that the firing atmosphere is preferably a reducing atmosphere. As the atmospheric gas, for example, it is preferable to use a wet mixed gas of $N_2$ and $H_2$.

When firing in a reducing atmosphere, the capacitor device body is preferably annealed. The annealing process is for reoxidizing the dielectric layer. Since this enables the IR lifetime to be remarkably prolonged, the reliability is improved.

The oxygen partial pressure in the annealing atmosphere is preferably not less than $10^{-9}$ atms, in particular $10^{-6}$ to $10^{-9}$ atms. If the oxygen partial pressure is less than the above range, reoxidation of the dielectric layer is difficult, while if over that range, the internal electrode layers tend to oxide.

The holding temperature at the time of annealing is preferably not more than 1100° C., in particular 500 to 1100° C. If the holding temperature is less than the above range, the oxidation of the dielectric layers becomes insufficient, so the IR tends to become low and the IR lifetime short. On the other hand, when the holding temperature exceeds the above range, not only do the internal electrode layers oxidize and the capacity fall, but also the internal electrode layers end up reacting with the dielectric material resulting in a tendency toward deterioration of the capacity-temperature characteristic, a fall in the IR, and a fall in the IR lifetime. Note that the annealing may be comprised of only a temperature raising process and temperature reducing process. That is, the temperature holding time may also be made zero. In this case, the holding temperature is synonymous with the maximum temperature.

The various conditions other than the above conditions are preferably determined from the following ranges:

Temperature holding time: 0 to 20 hours, in particular 6 to 10 hours

Cooling rate: 50 to 500° C./hour, in particular 100 to 300° C./hour

Note that for the atmospheric gas, wet $N_2$ gas etc. may be used.

In the processing of removing the binder, firing and annealing, for example a wetter etc. may be used to wet the $N_2$ gas or mixed gas. In this case, the temperature of the water is preferably 5 to 75° C.

The processing of removing the binder, firing and annealing may be performed consecutively or independently. When performing them consecutively, after the processing for removing the binder, the atmosphere is changed without cooling, then the temperature is raised to the holding temperature for firing, the firing is performed, then the chip is cooled, and preferably, the atmosphere is changed when the holding temperature of the annealing is reached, and then annealing is performed. On the other hand, when performing them independently, as to firing, it is preferable that the temperature is raised to the holding temperature at the time of the processing for removing the binder in an $N_2$ gas or wet $N_2$ gas atmosphere, then the atmosphere is changed and the temperature is further raised. Preferably, the chip is cooled to the holding temperature of the annealing, then the atmosphere changed again to an $N_2$ gas or wet $N_2$ gas atmosphere to continue cooling. Further, at the time of annealing, the temperature may be raised to the holding temperature in an $N_2$ gas atmosphere, then the atmosphere may be changed or the entire annealing process may be performed in a wet $N_2$ gas atmosphere.

The thus obtained capacitor device body is, for example, subjected to end polishing using barrel polishing or sand-blasting etc., then printed or transferred with an external electrode paste and fired to form the external electrodes 4. The firing conditions of the external electrode paste are for example preferably 600 to 800° C. for 10 minutes to 1 hour or so in a wet mixed gas of $N_2$ and $H_2$. Further, in accordance with need, the surfaces of the external electrodes 4 may be formed with a covering layer using plating technique etc.

The thus produced multi-layer ceramic capacitor of the present invention is mounted by soldering, etc. on a printed circuit board for use in various types of electronic equipment.

Note that the present invention is not limited to the above embodiments and may be modified in various ways within the scope of the invention.

For example, in the above embodiments, illustration was made of a multi-layer ceramic capacitor as the electronic device according to the present invention, but the electronic device according to the present invention is not limited to a multi-layer ceramic capacitor and may be any device having a dielectric layer comprised of a dielectric ceramic composition of the above composition.

The present invention will be explained based on further detailed examples below, but the present invention is not limited to the examples.

EXAMPLES 1~9 AND COMPARATIVE EXAMPLES 1~4

(Preparation of Samples of Quadratic Prism-shaped Multi-layer Ceramic Capacitors)

Ingredients selected from $BaTiO_3$, $MgCO_3$, $MnCo_3$, $(Ba_{0.6}Ca_{0.4})SiO_3$, $V_2O_5$, oxide of R1 and oxide of R2 with particle sizes of 0.1 to 1 $\mu$m were subjected to wet mixing using a ball mill for 16 hours and dried so that dielectric ingredient was prepared. A plurality of dielectric ingredients were prepared by changing the mixing ratio of the ingredients powders in the composition of the dielectric ingredients.

In the present example, with respect to 100 moles of $BaTiO_3$, $Yb_2O_3$ as a fourth subcomponent (an oxide of R1) and $Y_2O_3$ as a fifth subcomponent (an oxide of R2) were used, other additives were measured to be a composition amount described in Table 1, then subjected to wet mixing by a ball mill and dried so as to prepare a dielectric ingredient.

Note that $BaTiO_3$ was obtained by a hydrothermal synthesis powder method or an oxalate method, etc. The same characteristics was obtained regardless the method.

To the above dielectric ingredient is added 0.05 wt % of polyvinyl alcohol as a binder, and the binder and the dielectric composition were mixed to be powders. Three grams of the powdered dielectric composition was measured and pressed to be a stick shape of 35 mm×5 mm×5 mm. The molded article was processed to remove the binder under conditions of a temperature rise rate of 300° C./hour, a holding temperature of 800° C., a holding time of 2 hours and an air and wet nitrogen gas atmosphere of ($1 \times 10^{-5}$ atm).

Then, the molded article was fired under conditions of a rate of temperature rise of 200° C./hour at 1280° C. to 1370° C., a holding time of 2 hours, a cooling rate of 300° C./hour and a mixed gas atmosphere of wet nitrogen gas and a nitrogen gas of (×10 atm) to obtain a sintered body of about 30 mm×4.5 mm×4.5 mm. Further, the sintered body was annealed under conditions of a holding temperature of 900° C., a holding time of 9 hours, a cooling rate of 300° C./hour and a wet nitrogen gas atmosphere of ($1 \times 10^{-5}$ atm). Note that a wetter was used to wet the respective atmosphere gases and the water temperature was 35° C.

The thus obtained prism-shaped ceramic sintered body sample was subjected to mirror finish polishing processing to be 35 mm×3 mm×3 mm, which was used as a sample for measuring transverse strength. The transverse strength of the thus obtained sample was measured by a three-point bending test method. The result was shown in FIG. 1.

As to the dielectric ceramic characteristic, a density of the sintered body was calculated from the dimensions and weight of the prism-shaped sintered sample and the result was used for evaluating the sinterability. The density of the sintered body is shown in Table 1.

The obtained prism-shaped ceramic sintered body samples were measured by a powder X-ray (Cu-Kα-ray) diffraction apparatus between 2θ=29 to 32° under the following conditions to confirm an existence of a deposition phase and to identify.

X-ray generation conditions: 45 kV-40 mA

Scan width: 0.01°

Scan rate: 0.2°/minute

X-ray detection conditions

Parallel slits: 0.5°

Dispersion slits: 0.5°

Light receiving slits: 0.15 mm

The result was shown in Table 1.

Furthermore, the obtained prism-shaped ceramic sintered body samples were taken a SEM picture to confirm an existence of plate-shaped or acicula deposition.

Also, The specific resistance at 25° C. was measured for the obtained prism-shaped ceramic sintered body samples. The specific resistance was measured by an insulator resistance meter (R8340A (50V-1 minute value) made by Advantest Co.). The results were shown in the tables.

(Preparation of Multi-layer Ceramic Capacitor)

As to a dielectric paste was prepared, 100 parts by weight of the respective dielectric materials, 4.8 parts by weight of acrylic resin, 40 parts by weight of methylene chloride, 20 parts by weight of ethyl acetate, 6 parts by weight of mineral spirits, and 4 parts by weight of acetone were mixed by a ball mill to make a paste.

As to an internal electrode paste, 100 parts by weight of Ni particles of an average particle size of 0.2 to 0.8 μm, 40 parts by weight of an organic vehicle (8 parts by weight of an ethyl cellulose resin dissolved in 92 parts by weight of butyl carbitol), and 10 parts by weight of butyl carbitol were kneaded using a triple-roll to make a paste.

As to an external electrode paste, 100 parts by weight of Cu particles of an average particle size of 0.5 μm, 35 parts by weight of an organic vehicle (8 parts by weight of an ethyl cellulose resin dissolved in 92 parts by weight of butyl carbitol), and 7 parts by weight of butyl carbitol were kneaded together to make a paste.

Next, the above dielectric layer paste was used to form a green sheet having a thickness of 15 μm on a PET film. An internal electrode paste was printed on this, then the sheet was peeled from the PET film. Next, the thus obtained green sheets were stacked, adhered by a pressure to prepare a green chip. The number of stacked layer of the green sheet having the internal electrode was five.

First, the green chip was cut to a predetermined size and was processed to remove the binder, fired, and annealed to obtain the multi-layer ceramic sintered body. The dimension of the respective sintered body samples were 3.2 mm×1.6 mm×0.6 mm, the thickness of the dielectric layer was about 10 μm, and the thickness of the internal electrode was 2 μm.

The external electrodes were formed by polishing the end faces of the sintered body by sandblasting, then transferring the external electrode paste to the end faces and fired them there in a wet $N_2$ and $H_2$ atmosphere at 800° C. for 10 minutes, so as to obtain a multi-layer ceramic capacitor.

The precessing to remove the binder was performed under the following conditions.

Rate of temperature rise: 15° C./hour

Holding temperature: 280° C.

Temperature holding time: 8 hours

Atmosphere: in the air

Firing was performed under the following conditions.

Rate of temperature rise: 200° C./hour

Holding temperature: 1200 to 1300° C.

Temperature holding time: 2 hours

Cooling rate: 300° C./hour

Atmospheric gas: wet $N_2+H_2$ mixed gas

Oxygen partial pressure: $10^{-11}$ atms

Annealing was performed under the following conditions.

Holding temperature: 900° C.

Temperature holding time: 9 hours

Cooling rate: 300° C./hour

Annealing atmosphere: wet $N_2$ gas

Oxygen partial pressure: $10^{-7}$ atms

The thus obtained multi-layer ceramic capacitor samples were measured a relative dielectric constant ($\in_r$), a dielectric loss (tan δ), and capacity temperature characteristics. The capacitance and dielectric loss (tan δ) of the multi-layer ceramic capacitor were measured by an LCR meter under conditions of 1 kHz and 1 Vrms. A specific dielectric rate ($\in r$) was calculated from the obtained capacitance, electrode dimensions and a distance between electrodes.

As to the temperature characteristics of the capacity of the multi-layer ceramic capacitor samples, a capacitance was measured by using the LCR meter in a temperature range of −55 to 160° C., a voltage of 1V. Samples having the capacity change rate at the time of the reference temperature of 25° C. of within ±15% (X7R of the EIA standard) in the range of −55° C. to 125° C. were considered to satisfy the X7R temperature characteristic, while those having the capacity change rate of within ±15% (X8R of the EIA standard) in the range of −55° C. to 150° C. were considered to satisfy the X8R temperature characteristic. Samples which satisfied it were indicated in the tables as "O" and those not satisfying it as "X".

TABLE 1

| | oxide of R1 | | oxide of R2 | | | | | | Sintering Temperature | | tanδ |
|---|---|---|---|---|---|---|---|---|---|---|---|
| | kind | (mole) | kind | (mole) | MgO | (BaCa)SiO$_3$ | MnO | V$_2$O$_5$ | (° C.) | εr | (%) |
| Comparative example 1 | Yb | 4.3 | Y | 0.0 | 1.0 | 3.0 | 0.37 | 0.1 | 1280 | 2299 | 0.54 |
| | | | | | | | | | 1340 | 1978 | 0.44 |
| Example 1 | Yb | 4.3 | Y | 2.0 | 1.0 | 3.0 | 0.37 | 0.1 | 1300 | 2363 | 0.59 |
| | | | | | | | | | 1325 | 1948 | 0.43 |
| Example 2 | Yb | 4.3 | Y | 3.0 | 1.0 | 3.0 | 0.37 | 0.1 | 1300 | 2307 | 0.61 |
| | | | | | | | | | 1325 | 2070 | 0.44 |
| Example 3 | Yb | 4.3 | Y | 4.0 | 1.0 | 3.0 | 0.37 | 0.1 | 1300 | 2142 | 0.61 |
| | | | | | | | | | 1325 | 2049 | 0.45 |
| Example 4 | Yb | 4.3 | Y | 5.0 | 1.0 | 3.0 | 0.37 | 0.1 | 1300 | 1939 | 0.90 |
| | | | | | | | | | 1325 | 2015 | 0.46 |
| Example 5 | Yb | 4.3 | Y | 6.0 | 1.0 | 3.0 | 0.37 | 0.1 | 1300 | 1768 | 3.09 |
| | | | | | | | | | 1325 | 1874 | 0.54 |
| | | | | | | | | | 1370 | 1987 | 0.62 |
| Example 6 | Yb | 4.3 | Y | 8.0 | 1.0 | 3.0 | 0.37 | 0.1 | 1300 | 1512 | 5.15 |
| | | | | | | | | | 1325 | 1719 | 3.67 |
| | | | | | | | | | 1370 | 1780 | 0.93 |
| Comparative example 2 | Yb | 4.3 | Y | 10.0 | 1.0 | 3.0 | 0.37 | 0.1 | 1300 | 1396 | 5.36 |
| | | | | | | | | | 1325 | 1632 | 8.40 |
| Comparative example 3 | Yb | 0.0 | Y | 4.0 | 1.0 | 3.0 | 0.37 | 0.1 | 1325 | 2432 | 0.73 |
| Example 7 | Yb | 1.0 | Y | 4.0 | 1.0 | 3.0 | 0.37 | 0.1 | 1325 | 2447 | 0.60 |
| Example 8 | Yb | 2.0 | Y | 4.0 | 1.0 | 3.0 | 0.37 | 0.1 | 1325 | 2413 | 0.58 |
| Example 9 | Yb | 6.0 | Y | 4.0 | 1.0 | 3.0 | 0.37 | 0.1 | 1325 | 1832 | 0.45 |
| Comparative example 4 | Yb | 10.0 | Y | 4.0 | 1.0 | 3.0 | 0.37 | 0.1 | 1325 | 1740 | 6.82 |

TABLE 1-continued

| | $\rho 25$ | X-ray temperature characteristic | | SEM Deposition presence/ | sintered plate-shaped/ | sintered body density | transverse strength [kgf/mm$^2$] sample |
|---|---|---|---|---|---|---|---|
| | ($\Omega$cm) | X8R | X7R | none | acicula | mg/mm$^3$ | average |
| Comparative example 1 | 2.40E + 12 | ○ | ○ | presence | none | 5.42 | 8.4 |
| | 3.01E + 12 | X | ○ | presence | none | 5.75 | 9.6 |
| Example 1 | 1.72E + 12 | ○ | ○ | presence | presence | 5.73 | 10.1 |
| | 3.61E + 12 | ○ | ○ | presence | presence | 5.80 | 10.5 |
| Example 2 | 1.95E + 12 | ○ | ○ | presence | presence | 5.62 | 10.0 |
| | 3.40E + 12 | ○ | ○ | presence | presence | 5.76 | 10.3 |
| Example 3 | 1.71E + 12 | ○ | ○ | presence | presence | 5.58 | 10.0 |
| | 2.63E + 12 | ○ | ○ | presence | presence | 5.71 | 11.0 |
| Example 4 | 1.53E + 12 | ○ | ○ | presence | presence | 5.41 | 10.9 |
| | 3.82E + 12 | ○ | ○ | presence | presence | 5.65 | 11.3 |
| Example 5 | 4.12E + 10 | ○ | ○ | presence | presence | 5.13 | 10.9 |
| | 4.51E + 12 | ○ | ○ | presence | presence | 5.37 | 12.1 |
| | 6.98E + 12 | ○ | ○ | presence | presence | 5.78 | 13.2 |
| Example 6 | 2.92E + 08 | X | ○ | presence | presence | 4.57 | 9.0 |
| | 2.50E + 10 | ○ | ○ | presence | presence | 4.88 | 10.0 |
| | 4.41E + 12 | ○ | ○ | presence | presence | 5.59 | 10.9 |
| Comparative example 2 | 2.64E + 08 | X | X | presence | presence | 4.45 | 8.1 |
| | 2.64E + 09 | X | X | presence | presence | 4.68 | 10.0 |
| Comparative example 3 | 3.67E + 12 | X | ○ | none | none | 5.66 | 9.7 |
| Example 7 | 3.42E + 12 | ○ | ○ | none | none | 5.73 | 10.3 |
| Example 8 | 1.73E + 12 | ○ | ○ | presence | presence | 5.72 | 11.0 |
| Example 9 | 4.23E + 12 | ○ | ○ | presence | presence | 5.50 | 11.8 |
| Comparative example 4 | 3.66E + 09 | X | X | presence | presence | 4.88 | 8.2 |

(Evaluation)

As shown in Table 1, it was confirmed that comparing with the Comparative Examples 1 to 4 outside the composition range of the present invention, the Examples 1 to 9 within the composition range of the present invention had a transverse strength of more than 10 kgf/mm$^2$, which is sufficiently high. It was also confirmed that in the compositions of the Examples 1 to 9, a plate-shaped or acicula deposition phase was appeared inside the dielectric base phase and the compositions had improved transverse strength comparing with the composition according to the Comparative Examples 1 to 4 without any plate-shaped or acicula deposition. The deposition phase is considered to be oxide mainly of rare earth and Ti. Note that in the Examples 1 to 9, the transverse strength becomes lower than 10 kgf/mm$^2$ in accordance with the sintering temperature in some cases, but a sufficient transverse strength can be obtained by appropriately setting the sintering temperature.

Also, in the composition range of the Examples 1 to 9, it was confirmed that a dielectric composition having a resistance to reduction was obtained and the X8R temperature characteristic was satisfied without being reduced by firing in a reducing atmosphere and without oxidizing Ni used as an internal electrode. It was also confirmed that the sintering density was 5.15 mg/mm$^3$ or more and sinterability was good in the composition range of the Examples 1 to 9. Note that even in the Examples 1 to 9, the sintering density does not become more than 5.15 mg/mm$^3$ in accordance with the sintering temperature in some cases, but sufficient sinterability can be obtained by appropriately setting the sintering temperature.

Furthermore, in the composition range of the Examples 1 to 9, the dielectric loss (tan $\delta$) was within 5% and a specific resistance was 1E+11 or more, thus excellent characteristics as a capacitor was confirmed. Note that even in the Examples 1 to 9, these conditions are not satisfied in accordance with the sintering temperature, but preferable dielectric loss and specific resistance can be obtained by appropriately setting the sintering temperature.

EXAMPLES 10~14 AND COMPARATIVE EXAMPLES 5~7

Prism-shaped ceramic sintered body samples and multilayer ceramic capacitor samples were prepared in the same way as in Examples 1 to 9 excepting that Yb was added as a fourth subcomponent (an oxide of R1) by a composition amount to be 4.3 mol, Eu, Gd, Tb, Dy, Ho, Nb, Ta or Sm was added as a fifth subcomponent (an oxide of R2) respectively by a composition amount to be 2 mol as an element, and other additives were mixed by the amount shown in Table 2.

Characteristics of the samples are shown in Table 2 as the results of measuring in the same way as in the Examples 1 to 9.

TABLE 2

| | oxide of R1 | | oxide of R2 | | MgO | (BaCa)SiO$_3$ | MnO | V$_2$O$_5$ | sintering temperature (° C.) | $\epsilon$r | tan$\delta$ (%) |
|---|---|---|---|---|---|---|---|---|---|---|---|
| | kind | (mole) | kind | (mole) | | | | | | | |
| Example 10 | Yb | 4.3 | Eu | 2.0 | 1.0 | 3.0 | 0.37 | 0.1 | 1320 | 2118.7 | 0.49 |
| Example 11 | Yb | 4.3 | Gd | 2.0 | 1.0 | 3.0 | 0.37 | 0.1 | 1320 | 2090.8 | 0.53 |

TABLE 2-continued

| | | | | | | | | | | | |
|---|---|---|---|---|---|---|---|---|---|---|---|
| Example 12 | Yb | 4.3 | Tb | 2.0 | 1.0 | 3.0 | 0.37 | 0.1 | 1320 | 2248.8 | 0.54 |
| Example 13 | Yb | 4.3 | Dy | 2.0 | 1.0 | 3.0 | 0.37 | 0.1 | 1320 | 2330.4 | 0.55 |
| Example 14 | Yb | 4.3 | Ho | 2.0 | 1.0 | 3.0 | 0.37 | 0.1 | 1320 | 2091.7 | 0.53 |
| Comparative example 5 | Yb | 4.3 | Nb | 2.0 | 1.0 | 3.0 | 0.37 | 0.1 | 1320 | 2515.8 | 0.83 |
| Comparative example 6 | Yb | 4.3 | Ta | 2.0 | 1.0 | 3.0 | 0.37 | 0.1 | 1320 | 2628.8 | 0.99 |
| Comparative example 7 | Yb | 4.3 | Sm | 2.0 | 1.0 | 3.0 | 0.37 | 0.1 | 1320 | 2205.1 | 0.52 |

| | $\rho 25$ ($\Omega$cm) | Temperature characteristic X8R | Temperature characteristic X7R | X-ray Deposition presence/none | SEM plate-shaped/acicula | sintered body density mg/mm$^3$ | transverse strength [kgf/mm$^2$] sample average |
|---|---|---|---|---|---|---|---|
| Example 10 | 2.11E + 12 | ○ | ○ | presence | presence | 5.79 | 10.9 |
| Example 11 | 5.31E + 12 | ○ | ○ | presence | presence | 5.83 | 10.9 |
| Example 12 | 2.66E + 12 | ○ | ○ | presence | presence | 5.78 | 11.0 |
| Example 13 | 2.02E + 12 | ○ | ○ | presence | presence | 5.69 | 11.8 |
| Example 14 | 2.28E + 12 | ○ | ○ | presence | presence | 5.78 | 10.9 |
| Comparative example 5 | 8.01E + 11 | X | X | presence | none | 5.14 | 7.0 |
| Comparative example 6 | 5.32E + 11 | X | X | presence | none | 5.00 | 5.9 |
| Comparative example 7 | 4.77E + 12 | X | ○ | presence | non | 5.83 | 8.4 |

TABLE 3

| | oxide of R1 | | oxide of R2 | | MgO | (BaCa)SiO$_3$ | MnO | V$_2$O$_5$ | sintering temperature (° C.) | Cp nF | temperature characteristic X8R | temperature characteristic X7R | transverse strength [kgf/mm$^2$] average |
|---|---|---|---|---|---|---|---|---|---|---|---|---|---|
| | kind | (mole) | kind | (mole) | | | | | | | | | |
| Comparative example 8 | Yb | 4.3 | Y | 0.0 | 1.0 | 3.0 | 0.37 | 0.1 | 1300 | 102 | ○ | ○ | 25.8 |
| Example 15 | Yb | 4.3 | Y | 4.0 | 1.0 | 3.0 | 0.37 | 0.1 | 1300 | 100 | ○ | ○ | 29.9 |

(Evaluation)

As shown in FIG. 2, it was confirmed that transverse strength is improved in the cases of the Examples 10 to 14 wherein Ho, Y, Dy, Eu, Gd or Tb was added comparing with the Comparative Example 1 in Table 1 wherein the fifth subcomponent (an oxide of R2) is not added. Also, it was confirmed that transverse strength is improved in the cases of the Examples 10 to 14 wherein Ho, Y, Dy, Eu, Gd or Tb was added within the composition range of the present invention comparing with the Comparative Examples 5 to 7, wherein Nb, Ta or Sm of outside the composition range of the present invention was added. It was also confirmed that, in the composition range of the present Examples 10 to 14, the X8R characteristics was satisfied, the dielectric loss (tan δ) was 5% or less, the specific resistance was 1E+11 or more, so the characteristics as a capacitor was excellent.

EXAMPLE 15 AND COMPARATIVE EXAMPLE 8

Multi-layer ceramic capacitor samples were prepared in the same way as in the Examples 1 to 9 excepting that the dielectric ceramic compositions were prepared as shown in Table 3, the thickness of the dielectric layer was 16 μm, the number of dielectric layer was 46, and the dimensions of the respective capacitor samples were 3.2 mm×1.6 mm×1.0 mm.

The results of measuring characteristics of the capacitor samples in the same way as in the Examples 1 to 9 were shown in Table 3. Note that those on which external electrodes are not formed were used for measuring the transverse strength by a three-point bending test method of the capacitor samples.

(Evaluation)

As shown in Table 3, it was also confirmed that the transverse strength was improved in the multi-layer capacitor samples of the composition according to the Example 15 comparing with the capacitor sample of the composition according to the Comparative Example 8. It was also confirmed that a dielectric composition having a resistance to reduction was obtained without being reduced by firing in a reducing atmosphere and without oxidizing Ni used as an internal electrode.

It was also confirmed that the X8R temperature characteristics can be satisfied in the case of the present Example 15.

EXAMPLE 16

A prism-shaped ceramic sintered body sample was prepared in the same way as in the Example 1 excepting that Yb in the fourth subcomponent (an oxide of R1) was 6.00 mole %, Y in the fifth subcomponent (an oxide of R2) was 4.00 mole % and the sintering temperature was 1325° C.

Figure 2A:
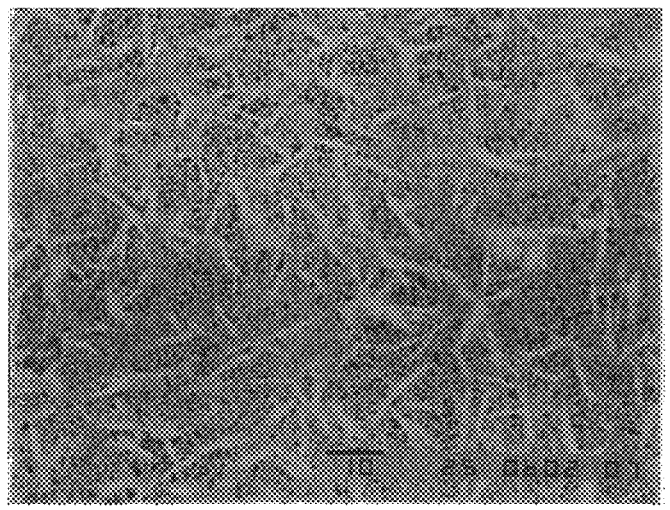
FIG. 2A is a SEM picture (reflection electronic image) of a dielectric ceramic composition according to an example of the present invention.

A SEM picture of the sample is shown in FIG. 2A. The SEM picture was taken by a scanning electronic microscope (SEM: production No. JSM-T300 manufactured by JEOL Ltd.), and conditions at the time of taking the picture was an accelerating voltage of 25 kV and a reflection electronic image was captured. The picture was taken with the magnifying power of 5000.

As shown in FIG. 2A, a plate-shaped or acicula deposition phase existing together in the dielectric base phase of $BaTiO_3$ as the main component was observed.

COMPARATIVE EXAMPLE 9

A prism-shaped ceramic sintered body sample was prepared in the same way as in the Example 1 excepting that Yb in the fourth subcomponent (an oxide of R1) was 0 mole %, Y in the fifth subcomponent (an oxide of R2) was 4 mole % and the sintering temperature was 1325° C.

The SEM picture of the sample was taken in the same way as in the Example 16. The picture is shown in FIG. 2B.

Figure 2B:
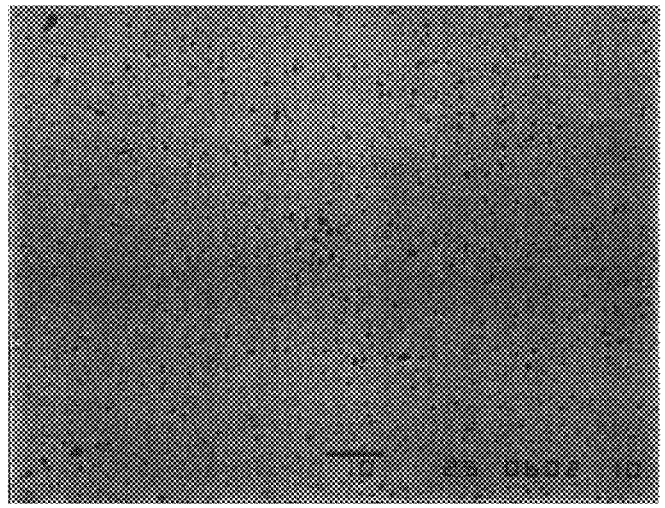
FIG. 2B is a SEM picture (reflection electronic image) of a dielectric ceramic composition according to a comparative example of the present invention.

As shown in FIG. 2B, plate-shaped or acicula deposition phase was not observed.

EXAMPLE 17

A prism-shaped ceramic sintered body sample was prepared in the same way as in the Example 1 excepting that Yb in the fourth subcomponent (an oxide of R1) was 4.3 mole %, Y in the fifth subcomponent (an oxide of R2) was 8.00 mole % and the sintering temperature was 1325° C.

The SEM picture of the sample was taken in the same way as in the Example 16. The picture is shown in FIG. 3A.

Figure 3A:
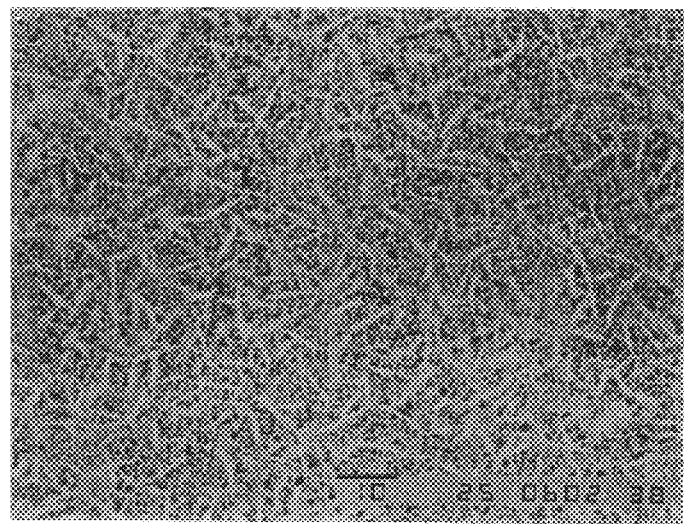
FIG. 3A is a SEM picture (reflection electronic image) of a dielectric ceramic composition according to another example of the present invention.

As shown in FIG. 3A, a plate-shaped or acicula deposition phase existing together in the dielectric base phase of $BaTiO_3$ as the main component was observed.

COMPARATIVE EXAMPLE 10

A prism-shaped ceramic sintered body sample was prepared in the same way as in the Example 1 excepting that Yb in the fourth subcomponent (an oxide of R1) was 4.3 mole %, Y in the fifth subcomponent (an oxide of R2) was 0 mole % and the sintering temperature was 1280° C.

The SEM picture of the sample was taken in the same way as in the Example 16. The picture is shown in FIG. 3B.

Figure 3B:
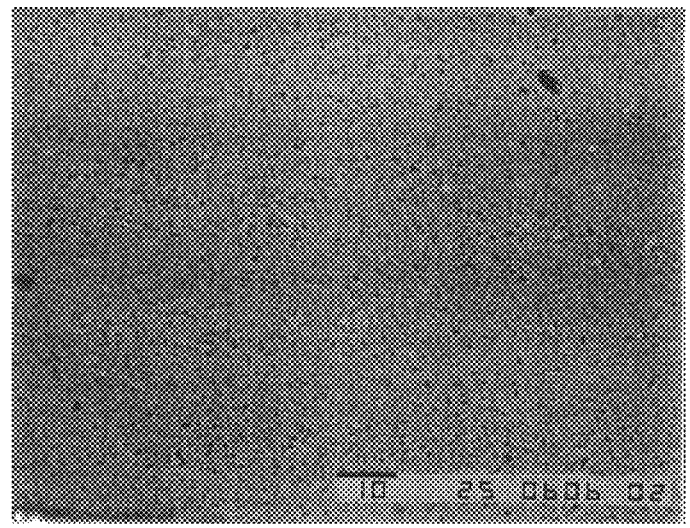
FIG. 3B is a SEM picture (reflection electronic image) of a dielectric ceramic composition according to another comparative example of the present invention.

As shown in FIG. 3B, plate-shaped or acicula deposition phase was not observed.

EXAMPLE 18

A prism-shaped ceramic sintered body sample was prepared in the same way as in the Example 1 excepting that Yb in the fourth subcomponent (an oxide of R1) was 4.3 mole %, Y in the fifth subcomponent (an oxide of R2) was 4.0 mole % and the sintering temperature was 1325° C.

A secondary electron image (sintered natural surface) of the surface of the sample was taken by using an electronic microscope (production No. C800 manufactured by Hitachi Ltd.). A picture with a magnifying power of 1000 is shown in FIG. 4A and a picture with a magnifying power of 3000 is shown in FIG. 4B.

Figure 4A:
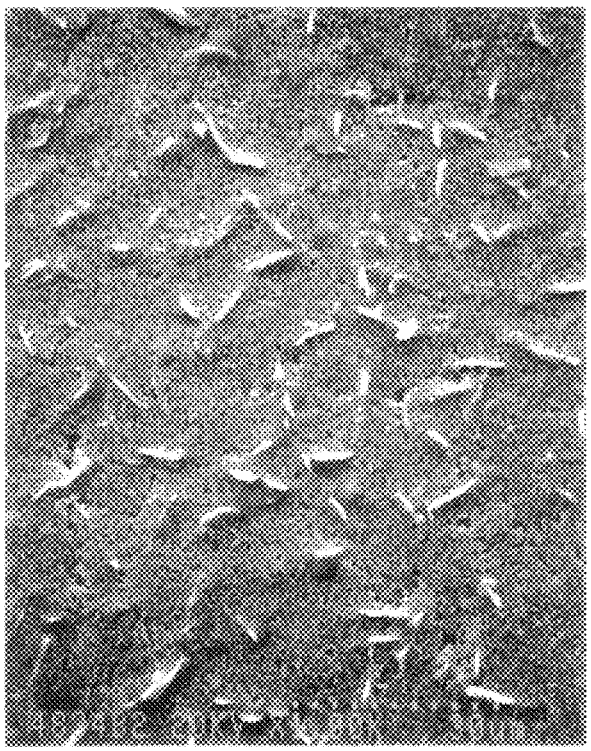
FIGS. 4A and 4B are SEM pictures ( secondary electron image) of a dielectric ceramic composition according to another example of the present invention.
Figure 4B:

As shown in FIGS. 4A and 4B, plate-shaped or acicula deposition phase existing together in the dielectric base phase of $BaTiO_3$ as the main component was observed.

As explained above, according to the present invention, a dielectric ceramic composition having a high specific dielectric constant, satisfying a capacity-temperature characteristic satisfying the X8R characteristic of the EIA standard (−55 to 150° C., ΔC=±15% or less), able to be sintered in a reducing atmosphere, and further, a multi-layer ceramic capacitor or other electronic device using this dielectric ceramic composition can be provided.

What is claimed is:

1. A dielectric ceramic composition comprising:
   a main component of $BaTiO_3$,
   a first subcomponent including at least one compound selected from MgO, CaO, BaO, SrO and $Cr_2O_3$,
   a second subcomponent of $(Ba, Ca)_xSiO_{2+x}$ (where, x=0.8 to 1.2),
   a third subcomponent including at least one compound selected from $V_2O_5$, $MoO_3$, and $WO_3$,
   a fourth subcomponent including an oxide of R1 (where R1 is at least one element selected from Sc, Er, Tm, Yb, and Lu), and
   a fifth subcomponent including an oxide of R2 (where R2 is at least one element selected from Y, Dy, Ho, Tb, Gb and Eu), wherein
   the ratios of the subcomponents to 100 moles of the main component of $BaTiO_3$ are:
      first subcomponent: 0.1 to 3 moles,
      second subcomponent: 2 to 10 moles,
      third subcomponent: 0.01 to 0.5 mole,
      fourth subcomponent: 0.5 to 7 moles (where the number of moles of the fourth subcomponent is the ratio of R1 alone), and
      fifth subcomponent: 2 to 9 moles (where the number of moles of the fifth subcomponent is the ratio of R2 alone).

2. The dielectric ceramic composition as set forth in claim 1, further comprising as a sixth subcomponent MnO, the content of the sixth subcomponent being not more than 0.5 mole with respect to 100 moles of the main component of $BaTiO_3$.

3. The dielectric ceramic composition as set forth in claim 1, wherein the total content of the fourth subcomponent and the fifth subcomponent are not more than 13 moles with respect to 100 moles of the main component of $BaTiO_3$ (where the numbers of moles of the fourth subcomponent and fifth subcomponent are the ratios of R1 and R2 alone).

4. The dielectric ceramic composition as set forth in claim 2, wherein the total content of the fourth subcomponent and the fifth subcomponent are not more than 13 moles with respect to 100 moles of the main component of $BaTiO_3$ (where the numbers of moles of the fourth subcomponent and fifth subcomponent are the ratios of R1 and R2 alone).

5. An electronic device having a dielectric layer, wherein said dielectric layer comprising:
   a main component of $BaTiO_3$,
   a first subcomponent including at least one compound selected from MgO, CaO, BaO, SrO and $Cr_2O_3$,
   a second subcomponent of $(Ba, Ca)_xSiO_{2+x}$ (where, x=0.8 to 1.2),
   a third subcomponent including at least one compound selected from $V_2O_5$, $MoO_3$, and $WO_3$, and
   a fourth subcomponent including an oxide of R1 (where R1 is at least one element selected from Sc, Er, Tm, Yb, and Lu),
   a fifth subcomponent including an oxide of R2 (where R2 is at least one element selected from Y, Dy, Ho, Tb, Gb and Eu),
   wherein:
      the ratios of the subcomponents to 100 moles of the main component of $BaTiO_3$ are:
         first subcomponent: 0.1 to 3 moles,
         second subcomponent: 2 to 10 moles,
         third subcomponent: 0.01 to 0.5 mole, fourth subcomponent: 0.5 to 7 moles (where the number of moles of the fourth subcomponent is the ratio of R1 alone), and fifth subcomponent: 2 to 9 moles (where the number of moles of the fifth subcomponent is the ratio of R2 alone).

6. The electronic device as set forth in claim 5, further comprising as a sixth subcomponent MnO, the content of the sixth subcomponent being not more than 0.5 mole with respect to 100 moles of the main component of $BaTiO_3$.

7. The electronic device as set forth in claim 5, wherein the total content of the fourth subcomponent and the fifth subcomponent are not more than 13 moles with respect to 100 moles of the main component of $BaTiO_3$ (where the numbers of moles of the fourth subcomponent and fifth subcomponent are the ratios of R1 and R2 alone).

8. The electronic device as set forth in claim 6, wherein the total content of the fourth subcomponent and the fifth subcomponent are not more than 13 moles with respect to 100 moles of the main component of $BaTiO_3$ (where the numbers of moles of the fourth subcomponent and fifth subcomponent are the ratios of R1 and R2 alone).

9. The electronic device as set forth in claim 5, having a capacitor device body comprised of dielectric layers and internal electrode layers alternately stacked.

10. The electronic device as set forth in claim 9, wherein the electroconductive material included in the internal electrode layers is Ni or an Ni alloy.

11. The electronic device as set forth in claim 6, having a capacitor device body comprised of dielectric layers and internal electrode layers alternately stacked.

12. The electronic device as set forth in claim 11, wherein the electroconductive material included in the internal electrode layers is Ni or an Ni alloy.

13. The electronic device as set forth in claim 7, having a capacitor device body comprised of dielectric layers and internal electrode layers alternately stacked.

14. The electronic device as set forth in claim 13, wherein the electroconductive material included in the internal electrode layers is Ni or an Ni alloy.

15. The electronic device as set forth in claim 8, having a capacitor device body comprised of dielectric layers and internal electrode layers alternately stacked.

16. The electronic device as set forth in claim 15, wherein the electroconductive material included in the internal electrode layers is Ni or an Ni alloy.

* * * * *